US010627207B2

(12) United States Patent
Li et al.

(10) Patent No.: US 10,627,207 B2
(45) Date of Patent: Apr. 21, 2020

(54) APERTURE MEASURING DEVICE AND AN APERTURE MEASURING METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Dingyuan Li, Beijing (CN); Ruwang Guo, Beijing (CN); Haifeng Chen, Beijing (CN); Jie Wang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 77 days.

(21) Appl. No.: 15/977,194

(22) Filed: May 11, 2018

(65) Prior Publication Data

US 2019/0017800 A1    Jan. 17, 2019

(30) Foreign Application Priority Data

Jul. 12, 2017   (CN) .......................... 2017 1 0566844

(51) Int. Cl.
*G01B 7/13*        (2006.01)
*G01B 3/50*        (2006.01)

(52) U.S. Cl.
CPC ................ *G01B 7/13* (2013.01); *G01B 3/50* (2013.01)

(58) Field of Classification Search
None
See application file for complete search history.

(56) References Cited

U.S. PATENT DOCUMENTS

| 5,604,989 A * | 2/1997 | Stevenson ................ G01B 3/46 33/506 |
| 2007/0051003 A1* | 3/2007 | Bennison ................ G01B 3/26 33/544 |
| 2008/0268173 A1 | 10/2008 | White et al. |

* cited by examiner

*Primary Examiner* — Jas A Sanghera
(74) *Attorney, Agent, or Firm* — Calfee, Halter & Griswold LLP

(57) ABSTRACT

An aperture measuring device and aperture measuring method for measuring the size of the aperture of a through-hole in a conductive structure is described to reduce the aperture measurement time and improve the working efficiency. The aperture measuring device includes: an aperture testing component for being inserted into the through-hole, wherein the aperture measuring device includes a plurality of resistor segments with different diameters, the individual resistor segments being successively connected in series in an order of the sizes of their diameters; and a measuring module for measuring the resistance value of a resistor segment unable to be inserted into the through-hole in the aperture testing component to determine the size of the aperture of the through-hole.

15 Claims, 3 Drawing Sheets

APERTURE MEASURING DEVICE AND AN APERTURE MEASURING METHOD

RELATED APPLICATION

The present disclosure claims priority of the Chinese patent application numbered 201710566844.6 filed on Jul. 12, 2017, all contents of which are incorporated herein by reference.

FIELD OF THE INVENTION

The disclosure relates to the field of measuring technology, and in particular, to an aperture measuring device and an aperture measuring method for measuring the aperture of a through-hole in a conductive structure.

BACKGROUND OF THE INVENTION

The principle of the Plasma Enhanced Chemical Vapor Deposition (PECVD) is to utilize a radio frequency (RF) to ionize a reactive gas into plasmas, and then form a film on a substrate by reaction. More particularly, first, the reactive gas enters from a backplane and passes through gas diffusion holes, and is ionized into plasmas under the action of the radio frequency; and afterwards, reactive ions and groups in the plasmas react to form a thin film on the substrate carried by a substrate bearing table. The substrate bearing table, a component of a plasma enhanced chemical vapor deposition device, provides a gas diffusion hole installation platform, which is connected with a chamber cover via a sealing ring. The chamber cover and a cavity constitute the whole chamber via the sealing ring to provide a space and vacuum environment required for coating.

Gas diffusion holes are distributed in an upper electrode included in the PECVD device, the size of the aperture of the gas diffusion holes has a great influence on the homogeneity of film formation, and therefore, it is often necessary to measure the size of the aperture of the gas diffusion holes in the upper electrode (for example, after the maintenance of the upper electrode is completed).

SUMMARY OF THE INVENTION

To overcome the above drawback and problem in the prior art, the disclosure provides an aperture measuring device and an aperture measuring method for measuring the aperture of a through-hole in a conductive structure. The aperture measuring device and method can greatly reduce the aperture measurement time, and thereby significantly improve the working efficiency.

According to an aspect of the disclosure, there is presented an aperture measuring device for measuring the aperture of a through-hole in a conductive structure, comprising:

an aperture testing component for being inserted into the through-hole, the aperture testing component comprising a plurality of resistor segments with different diameters, and the individual resistor segments being successively connected in series in an order of the sizes of the diameters; and a measuring module for measuring the resistance value of the resistor segment unable to be inserted into the through-hole in the aperture testing component to determine the aperture of the through-hole.

Different from the method in the prior art which directly utilizes the diameter of the maximum insertable Pin needle as the diameter of the through-hole to be measured, the aperture measuring device according to the disclosure indirectly determines the aperture by measuring the resistance value of the resistor segment unable to be inserted into the through-hole in the aperture testing component. As compared to the prior art, when utilizing the aperture measuring device according to the disclosure to measure the aperture of the through-hole, it is only needed to insert the aperture testing component into the through-hole to be measured for once, to be able to derive the aperture of the through-hole to be measured from the measured resistance value, without the need for inserting Pin needles for multiple times as in the prior art, and therefore it can evidently reduce the measurement time and improve the working efficiency. Especially when there are many through-holes to be measured, the advantage of high efficiency of the aperture measuring device of the disclosure can be better reflected.

In some embodiments of the aperture measuring device according to the disclosure, the measuring module is connected with the outermost end of the resistor segment with the largest diameter in the aperture testing component via a first wire, and connected with the periphery of the insertion inlet of the through-hole via a second wire. By such a connection mode, the measuring module easily measures the resistance value of the resistor segment that cannot be inserted into the through-hole.

In some embodiments of the aperture measuring device according to the disclosure, the aperture testing component may be arranged to be inserted into the insertion inlet of the through-hole from one end at which its resistor segment with the smallest diameter located, until the aperture testing component cannot continue to be inserted.

In some embodiments of the aperture measuring device according to the disclosure, the materials of all the resistor segments in the aperture testing component may be identical, and the individual resistor segments in the aperture testing component may be integrally molded, and thereby it is easy to produce and manufacture.

In some embodiments of the aperture measuring device according to the disclosure, the measuring module may be further configured for deriving the diameters of both the last resistor segment insertable into the through-hole and the first resistor segment unable to be inserted into the through-hole according to the measured resistance value and a predetermined resistance value of each resistor segment and its diameter, and determining the aperture of the through-hole according to the derived diameters.

In some embodiments of the aperture measuring device according to the disclosure, the measuring module may be further configured for, after deriving the diameters of both the last resistor segment insertable into the through-hole and the first resistor segment unable to be inserted into the through-hole, determining the aperture of the through-hole as the derived diameter of the last resistor segment insertable into the through-hole, in case of the last resistor segment insertable into the through-hole being in close contact with the through-hole; and determining the aperture of the through-hole as a mean value of the derived diameter of the last resistor segment insertable into the through-hole and the derived diameter of the first resistor segment unable to be inserted into the through-hole, in case of the last resistor segment insertable into the through-hole being not in close contact with the through-hole.

In some embodiments of the aperture measuring device according to the disclosure, the aperture measuring device may further include a display module for displaying the determined aperture of the through-hole. For example, the display module may be a liquid crystal display or an organic electroluminescent display, etc.

In some embodiments of the aperture measuring device according to the disclosure, the lengths of all the resistor segments in the aperture testing component may be identical. More particularly, the length of each resistor segment in the aperture testing component may be between 4 millimeters and 6 millimeters.

According to another aspect of the disclosure, there is presented an aperture measuring method for measuring the aperture of a through-hole in a conductive structure, comprising:

inserting an aperture testing component into the insertion inlet of the through-hole from one end at which the resistor segment with the smallest diameter is located, until the aperture testing component cannot continue to be inserted;

measuring the resistance value of the resistor segment not inserted into the through-hole in the aperture testing component;

deriving the diameters of both the last resistor segment insertable into the through-hole and the first resistor segment unable to be inserted into the through-hole according to the measured resistance value and a predetermined resistance value of each resistor segment in the aperture testing component and its diameter; and determining the aperture of the through-hole according to the derived diameters.

Clearly, the aperture measuring method according to the disclosure may also be carried out by using the aperture measuring device according to the embodiments of the disclosure. As compared to the prior art, the aperture measuring method according to the disclosure only needs to insert the aperture testing component into the through-hole to be measured for once and derive the aperture of the through-hole to be measured from the measured resistance value, without the need for inserting Pin needles for multiple times as in the prior art, and therefore it can significantly reduce the measurement time and greatly improve the working efficiency.

In some embodiments of the aperture measuring method according to the disclosure, the step of measuring the resistance value may include applying a voltage to the resistor segment(s) not inserted into the through-hole in the aperture testing component, measuring the current value flowing through the resistor segment(s), and deriving the resistance value of the resistor segment(s) not inserted into the through-hole in the aperture testing component according to the Ohm' law.

In some embodiments of the aperture measuring method according to the disclosure, the step of determining the aperture of the through-hole according to the derived diameters may include: determining the aperture of the through-hole as the derived diameter of the last resistor segment insertable into the through-hole in case of the last resistor segment insertable into the through-hole being in close contact with the through-hole; and determining the aperture of the through-hole as the mean value of the derived diameter of the last resistor segment insertable into the through-hole and the derived diameter of the first resistor segment unable to be inserted into the through-hole in case of the last resistor segment insertable into the through-hole being not in close contact with the through-hole.

In some embodiments of the aperture measuring method according to the disclosure, the method further includes displaying the determined aperture of the through-hole.

Figure 1:
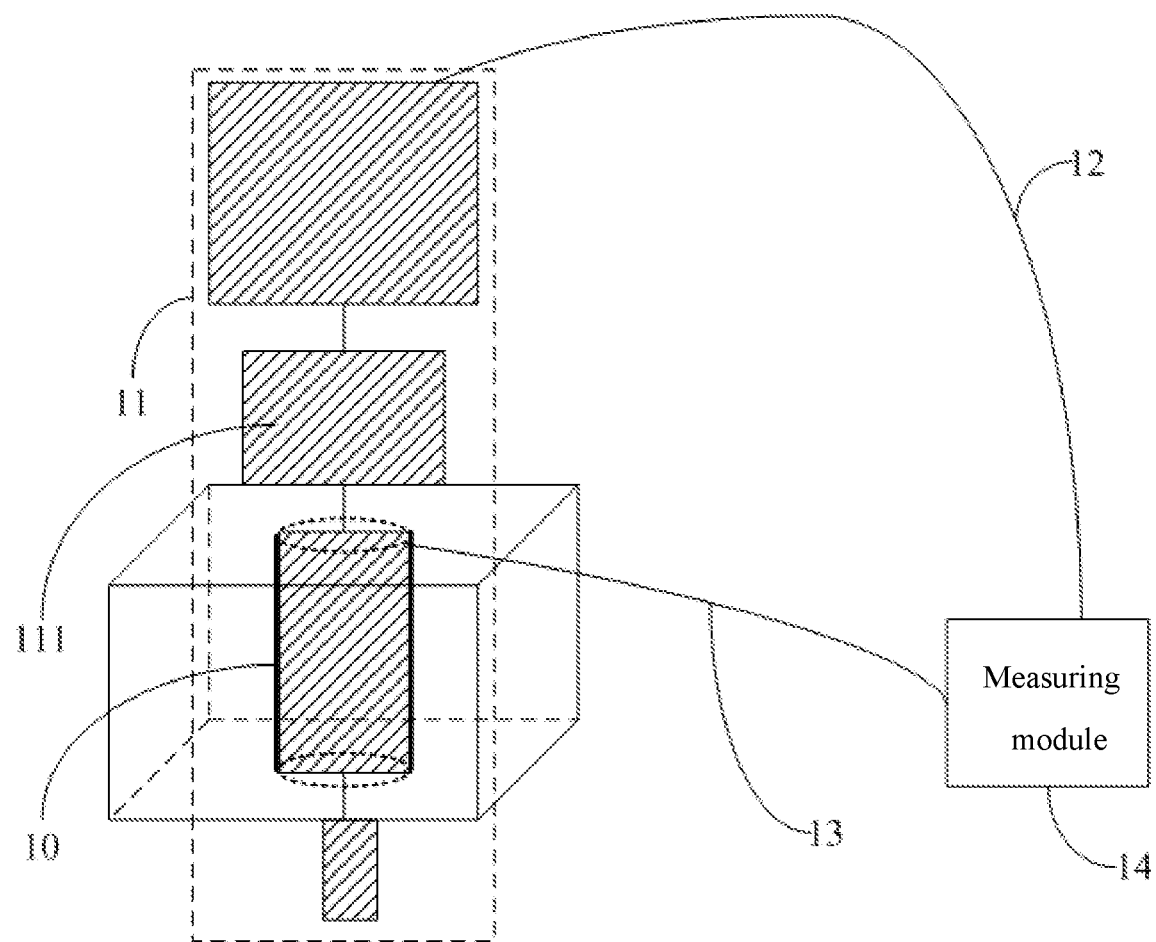
FIG. 1 is a structure diagram of an aperture measuring device according to a first embodiment of the disclosure.

The sizes and shapes of the areas of individual components in the drawings do not necessarily reflect the true scale of the individual components. The purpose of the drawings is to schematically illustrate the content of the disclosure.

DETAILED DESCRIPTION OF THE INVENTION

In order to make the objects, technical solutions and advantages of the disclosure clearer, the disclosure will be further described in detail in conjunction with the drawings in the following. Obviously, the described embodiments are just a part of the embodiments of the disclosure, and not all the embodiments. Based on the embodiments in the disclosure, all the other embodiments obtained by those of ordinary skills in the art under the premise of not paying out creative labor pertain to the scope protected by the disclosure.

An aperture measuring method is that Pin needles with different diameters are used to be successively inserted into a gas diffusion hole in increasing order of diameter, until no Pin needle can be inserted into the gas diffusion hole, and then the size of the diameter of the last inserted Pin needle may be considered as the size of the aperture of the gas diffusion hole.

Obviously, in such an aperture measuring method, since it is needed to insert multiple separate Pin needles into a gas diffusion hole in an order of ascending diameter, respectively, it needs to take a long time in the actual measurement process, thereby resulting in its low working efficiency.

In the following, an aperture measuring device and an aperture measuring method of the disclosure will be introduced in detail in conjunction with the drawings and specific embodiments.

FIG. 1 schematically shows a structure of an aperture measuring device according to a first embodiment of the disclosure. As shown in FIG. 1, the aperture measuring device for measuring the aperture of a through-hole 10 in a conductive structure according to the first embodiment of the disclosure includes an aperture testing component 11 for being inserted into the through-hole 10 via the insertion inlet of the through-hole, the aperture testing component 11 comprising a plurality of resistor segments 111 with different diameters, and the individual resistor segments 111 being successively connected in series in an order of the sizes of the diameters; and a measuring module 14 for measuring the resistance value of the resistor segment 111 unable to be inserted into the through-hole 10 in the aperture testing component 11 to determine the aperture of the through-hole 10.

As compared to the prior art, the aperture measuring device according to the disclosure as shown in FIG. 1 only needs to insert the aperture testing component into the through-hole to be measured for once and determine the aperture of the through-hole to be measured from the measured resistance value of the resistor segment unable to be inserted into the through-hole, without the need for inserting Pin needles for multiple times as in the prior art, thereby reducing the measurement time and improving the working efficiency. Especially when there are many apertures to be measured, the aperture measuring device of the first embodiment of the disclosure can reduce the measurement time more significantly and thus achieve the goal of high efficiency.

As shown in FIG. 1, in the aperture measuring device according to the first embodiment of the disclosure, the measuring module 14 may be connected with the outermost end of the resistor segment 111 with the largest diameter in the aperture testing component 11 via a first wire 12, and connected with the periphery of the insertion inlet of the through-hole 10 via a second wire 13. By such a connection mode, the measuring module 14 easily measures the resistance value of the resistor segment 111 that cannot be inserted into the through-hole 10. Of course, in order to measure the resistance value of the resistor segment 111 unable to be inserted into the through-hole 10, the measuring module 14 may also be connected with the resistor segment 111 in other ways.

In the aperture measuring device according to the first embodiment of the disclosure, the aperture testing component 11 may be arranged to be inserted into the insertion inlet of the through-hole from one end at which its resistor segment 111 with the smallest diameter is located, until the aperture testing component 11 cannot continue to be inserted, in the measurement process.

In the aperture measuring device according to the first embodiment of the disclosure, the length, the diameter and the resistance value of each resistor segment 111 in the aperture testing component 11 are predetermined values. Therein, the length and the diameter may be set according to the actual needs. For example, the specific set values of the diameter and the length of each resistor segment 111 may be set with reference to the sizes of the Pin needles in the prior art. In addition, after the materials, the lengths and the diameters of the resistor segments 111 are selected, the resistance values of the individual resistor segments 111 may be determined by pre-measurement. For example, it may be possible to first apply a preset voltage U to a resistor segment 111 to be measured, measure the current I flowing through the resistor segment 111, and then derive its resistance value R according to the calculation formula (e.g., the Ohm's law formula $R=U/I$) of the resistance value.

In some embodiments of the aperture measuring device according to the disclosure, the measuring module 14 may be configured for measuring the resistance value of the resistor segment 111 unable to be inserted into the through-hole 10, deriving the diameters of both the last resistor segment 111 insertable into the through-hole 10 and the first resistor segment 111 unable to be inserted into the through-hole 10 according to the measured resistance value and a predetermined resistance value of each resistor segment 111 and its diameter, and finally determining the aperture of the through-hole 10 according to the derived diameters.

Further, the aperture testing component 11 "cannot continue to be inserted" in the process of being inserted into the through-hole 10 may include two cases: (i) the last resistor segment 111 insertable into the through-hole 10 is in close contact with the through-hole 10, and at this point, the aperture of the through-hole may evidently directly take the derived diameter of the last resistor segment 111 insertable into the through-hole; and (ii) the last resistor segment insertable into the through-hole is not in close contact with the through-hole, and at this point, the aperture of the through-hole is obviously slightly greater than the diameter of the last resistor segment 111 insertable into the through-hole 10 and at the same time slightly less than the diameter of the first resistor segment 111 unable to be inserted into the through-hole 10 (at this point, clearly, neither of the derived diameters can be directly taken as the aperture value), so in order to obtain a more accurate aperture value, the aperture of the through-hole may be taken as the arithmetic mean value of the derived two diameters. Thus, with respect to the above two cases, the measuring module 14 may be configured to: determine the aperture of the through-hole as the derived diameter of the last resistor segment 111 insertable into the through-hole in case of the last resistor segment 111 insertable into the through-hole 10 being in close contact with the through-hole 10; and determine the aperture of the through-hole as the mean value of the derived diameter of the last resistor segment 111 insertable into the through-hole 10 and the derived diameter of the first resistor segment 111 unable to be inserted into the through-hole 10 in case of the last resistor segment 111 insertable into the through-hole 10 being not in close contact with the through-hole 10. As such, as compared to the scheme in the prior art which just takes the diameter of the last insertable Pin needle as the aperture, the aperture measuring device according to the embodiment of the disclosure can more accurately obtain the aperture of the through-hole 10.

In the aperture measuring device according to the first embodiment of the disclosure, the material of each resistor segment 111 in the aperture testing component 11 may be identical. As such, the selection of the actual material is more convenient and simpler, and can save the material cost.

Figure 2:
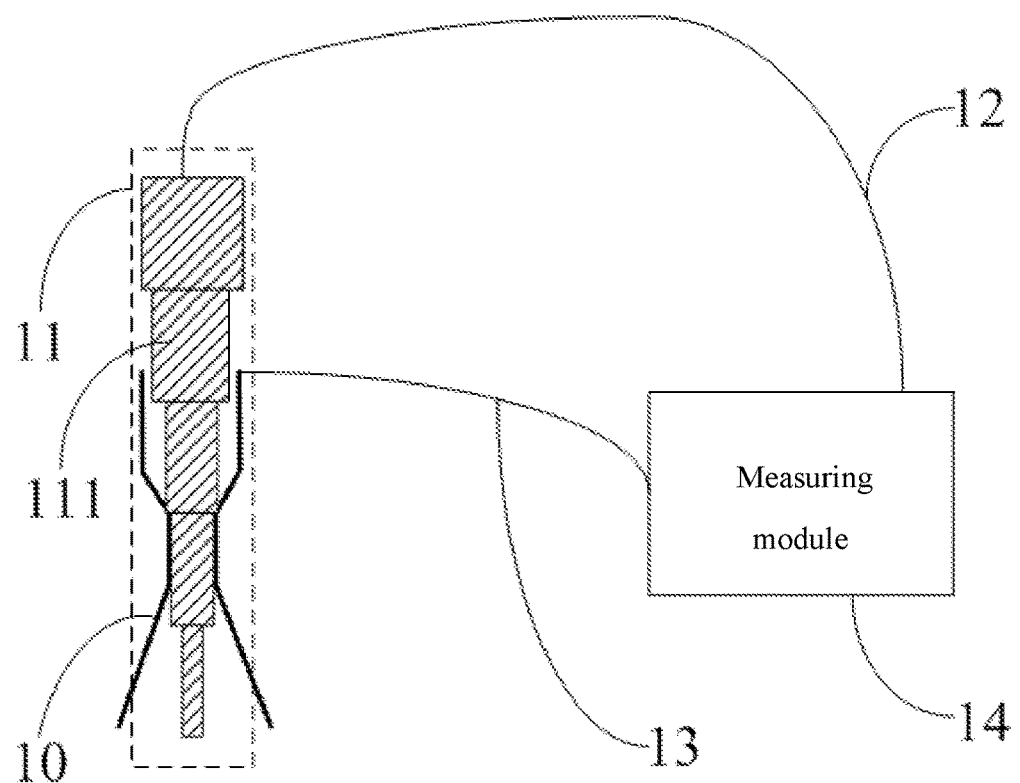
FIG. 2 is a structure diagram of an aperture measuring device according to a second embodiment of the disclosure.

FIG. 2 schematically shows a structure of an aperture measuring device according to a second embodiment of the disclosure. As shown in FIG. 2, in the aperture measuring device according to the second embodiment of the disclosure, the conductive structure may be an upper electrode of a plasma chemical vapor deposition device, and the through-hole to be measured in the upper electrode includes multiple through-holes for diffusing a gas included therein. As shown in FIG. 2, the shape of the through-hole to be measured is funnel-shaped, to ensure that the gas is uniformly diffused after passing through the through-hole.

As shown in FIG. 2, in the aperture measuring device according to the second embodiment of the disclosure, the plurality of resistor segments 111 connected together in series in the aperture testing component 11 are integrally molded. In the actual production process, one whole resistor raw material may be made into an aperture testing component 11 constituted by multiple resistor segments 111 with monotonically varying diameters (as shown in FIG. 2, the diameters of the resistor segments 111 monotonically decrease from top to bottom). This can not only save the raw material, but also obtain the aperture testing component 11 in a simpler way.

As shown in FIG. 2, in the aperture measuring device according to the second embodiment of the disclosure, the length of each resistor segment 111 in the aperture testing component 11 is identical so as to be more beneficial to the arrangement of the aperture testing component 11 in the actual design. In addition, the length of each resistor segment 111 may be set between 4 millimeters and 6 millimeters. Since generally the depth of the aperture to be measured is approximately 2 mm, setting the length of each resistor segment 111 to be 4 mm to 6 mm can better cause a resistor segment 111 to be in close contact with the through-hole 10 after the aperture testing component 11 is inserted into the through-hole 10. Moreover, the length of the resistor segments 111 may be appropriately adjusted according to the depth of the aperture to be measured.

Figure 3:
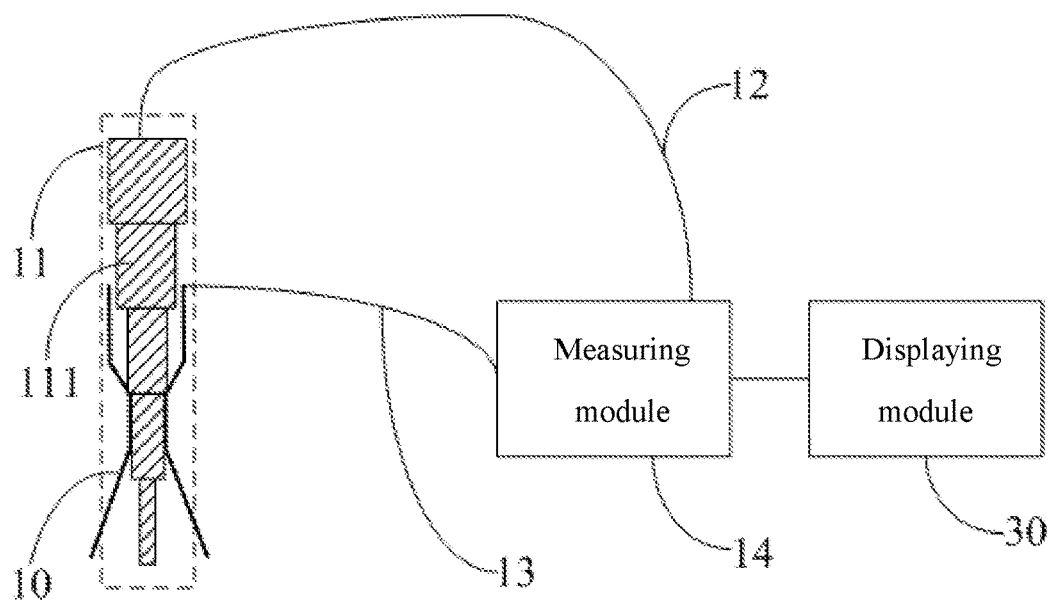
FIG. 3 is a structure diagram of an aperture measuring device according to a third embodiment of the disclosure.

FIG. 3 schematically shows a structure of an aperture measuring device according to a third embodiment of the disclosure. As shown in FIG. 3, the structure of the aperture measuring device according to the third embodiment of the disclosure is substantially the same as that of the aperture measuring device shown in FIG. 2, and the difference lies in that the aperture measuring device shown in FIG. 3 further includes a display module 30, wherein the display module 30 may be connected with the measuring module 14 for displaying the aperture of the through-hole 10 determined by the measuring module 14. As such, the determined aperture of the through-hole may be intuitively presented to a user via the display module 30.

In the aperture measuring device according to the third embodiment of the disclosure, the display module 30 may be a liquid crystal display or an organic electroluminescent display, etc. Of course, the display module 30 may also employ other display devices, and the disclosure will not define the specific type of the display module 30.

In the aperture measuring device according to the third embodiment of the disclosure, a voice output device (not shown) may further be added, to inform the user of the determined aperture of the through-hole by way of voice. In this way, the user experience may further be enhanced.

To better verify the performance advantages of the aperture measuring device according to the embodiments of the disclosure over the prior art, a measurement experiment has been performed. In the process of the measurement experiment, during one and same preset period of time, the Pin needles in the prior art and the aperture measuring device according to the embodiments of the disclosure are employed to measure the aperture of a gas diffusion hole, respectively. The measurement results show that, in the same preset period of time, the apertures of only 25 gas diffusion holes can be measured in the case of employing the Pin needles in the prior art for measurement, whereas when the aperture measuring device according to the disclosure is employed for measurement, the apertures of up to 100 gas diffusion holes can be measured.

It can be seen from the above experiment results that the number of apertures measured by the aperture measuring device according to the disclosure per unit time is up to 4 times that of the prior art. In other words, the working efficiency of the aperture measuring device according to the disclosure is significantly improved as compared to the prior art. Further, when the number of through-holes to be measured is large, for example, thousands of gas diffusion holes are distributed in the upper electrode included in the plasma chemical vapor deposition device, the aperture measuring device according to the disclosure can better reflect its advantage of high efficiency, since the measurement time per aperture is greatly shortened.

Figure 4:
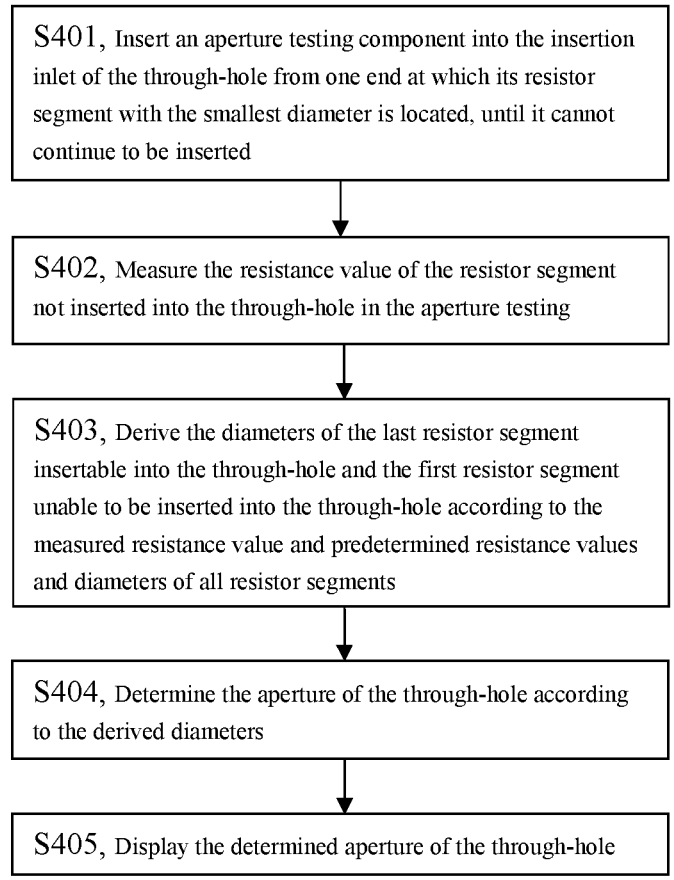
FIG. 4 is a flow chart of an aperture measuring method according to an embodiment of the disclosure.

FIG. 4 shows a flow chart of an aperture measuring method according to an embodiment of the disclosure. Based on the same inventive concept as above, the disclosure provides the aperture measuring method for measuring the aperture of a through-hole in a conductive structure shown in FIG. 4. As shown in FIG. 4, the aperture measuring method according to the embodiment of the disclosure includes:

S401, inserting an aperture testing component which is formed by connecting a plurality of resistor segments with different diameters in series in an order of the sizes of the diameters into the insertion inlet of the through-hole from one end at which the resistor segment with the smallest diameter is located, until the aperture testing component cannot continue to be inserted;

S402, measuring the resistance value of the resistor segment not inserted into the through-hole in the aperture testing component;

S403, deriving the diameters of both the last resistor segment insertable into the through-hole and the first resistor segment unable to be inserted into the through-hole according to the measured resistance value and a predetermined resistance value of each resistor segment in the aperture testing component and its diameter; and S404, determining the aperture of the through-hole according to the derived diameters.

Clearly, the aperture measuring method as shown in FIG. 4 may also be carried out by using the above described aperture measuring device according to the embodiments of the disclosure. As compared to the prior art, the aperture measuring method according to the disclosure only needs to insert the aperture testing component into the through-hole to be measured for once and derive the aperture of the through-hole to be measured from the measured resistance value, without the need for inserting Pin needles for multiple times as in the prior art, and therefore it can significantly reduce the measurement time and thus greatly improve the working efficiency.

Further, as shown in FIG. 4, the aperture measuring method according to an embodiment of the disclosure may further include step S405 of displaying the determined aperture of the through-hole. As such, the determined aperture may be intuitively presented for viewing by a user.

In the aperture measuring method according to an embodiment of the disclosure, the step S402 of measuring the resistance value of the resistor segment not inserted into the through-hole in the aperture testing component may include applying a preset voltage U across the resistor segment not inserted into the through-hole, measuring the current value I flowing through the resistor segment, and deriving the resistance value R of the resistor segment not inserted into the through-hole according to the Ohm's law, that is, the formula $R=U/I$.

In the aperture measuring method according to an embodiment of the disclosure, the step S404 of determining the aperture of the through-hole according to the derived diameters further includes determining the aperture of the through-hole as the derived diameter of the last resistor segment insertable into the through-hole in case of the last resistor segment insertable into the through-hole being in close contact with the through-hole; and determining the aperture of the through-hole as the mean value of the derived diameter of the last resistor segment insertable into the through-hole and the derived diameter of the first resistor segment unable to be inserted into the through-hole in case of the last resistor segment insertable into the through-hole is not in close contact with the through-hole. As such, in a case where the last resistor segment insertable into the through-hole is not in close contact with the through-hole, as compared to the scheme in the prior art which just takes the diameter of the last insertable Pin needle as the aperture, the method of taking the arithmetic mean value in the disclosure can obtain an much more accurate aperture.

In the following, the detailed process of the aperture measuring method according to an embodiment of the disclosure will be described in conjunction with a specific example. For purpose of illustration rather than limitation, the example employs the aperture measuring device according to the embodiments of the disclosure to implement the aperture measuring method.

First, as shown in FIG. 3, suppose that the aperture testing component 11 includes 5 resistor segments with the same length, the preset diameters of the individual resistor segments from small to large (from bottom to top in FIG. 3) are successively D1, D2, D3, D4 and D5 (the specific sizes of the diameters may be set with reference to the sizes of the Pin needles in the prior art), and the resistance values of the individual resistor segments from the end at which the diameter is the smallest to the other end at which the diameter is the largest (from bottom to top in FIG. 3) are successively 6Ω, 5Ω, 4Ω, 3Ω and 2Ω (which can be derived by measurement as described above). The corresponding relationship between the diameter and the resistance value of each resistor segment 111 of the aperture testing component 11 may refer to Table 1.

TABLE 1

A diameters-resistance correspondence table of resistor segment

| Diameter | D1 | D2 | D3 | D4 | D5 |
|---|---|---|---|---|---|
| Resistance value (Ω) | 6 | 5 | 4 | 3 | 2 |

The process of the aperture measuring method according to the specific example of the disclosure is as follows:

As shown in FIG. 3, first, the aperture testing component 11 is inserted into the through-hole 10 from the thinnest end, that is, i.e. from the resistor segment 111 with the smallest diameter (D1), until the aperture testing component 11 cannot be inserted any longer;

next, the measuring module 14 applies a preset voltage U to the resistor segment 111 not inserted into the through-hole 10, measures the current value I flowing through the resistor segment 111 not inserted into the through-hole 10, and obtains the resistance value R of the resistor segment 111 not inserted into the through-hole 10 according to the Ohm's law R=U/I, wherein suppose that the obtained resistance value R is 9Ω at this moment;

next, as shown in FIG. 3, according to the measured resistance value R=95Ω and the above table (Table 1) of correspondence between diameters and resistance values, the measuring module 14 may obtain that resistor segments 111 that cannot be inserted into the through-hole 10 include three resistor segments, of which the resistance values are 4Ω, 3Ω and 2Ω (since 9=4+3+2), respectively, and of which the diameters are D3, D4 and D5, respectively, and therefore, the resistance value of the last resistor segment inserted into the through-hole 10 (or the resistor segment with the largest diameter which has already been inserted into the through-hole 10) is 5Ω and its diameter is D2, whereas the resistance value of the first resistor segment unable to be inserted into the through-hole 10 (or the resistor segment with the smallest diameter which cannot be inserted into the through-hole 10) is 4Ω and its diameter is D3;

finally, the measuring module 14 determines the aperture of the through-hole 10 according to the following two cases:

(i) in a case where the last resistor segment 111 inserted into the through-hole 10 is in close contact with the through-hole 10, the diameter D2 of the resistor segment 111 may be seen as the aperture of the through-hole 10; and (ii) in a case in which the last resistor segment 111 inserted into the through-hole 10 is not in close contact with the through-hole 10, the aperture of the through-hole 10 may be determined as the mean value of the diameter D2 of the resistor segment 111 and the diameter D3 of the first resistor segment 111 unable to be inserted into the through-hole 10, that is, (D2+D3)/2.

In addition, the determined aperture value of the through-hole 10 may be presented via the display module 30 as shown in FIG. 3 or other video or audio output devices, such that the user can more directly and intuitively know the aperture value.

Certainly, various modifications and variations may be made to the disclosure by the skilled in the art without departing from the spirit and scope of the disclosure. As such, the disclosure is also intended to include these modifications and variations, if the modifications and variations of the disclosure pertain to the scope of the claims of the disclosure and the equivalence thereof.

The invention claimed is:

1. An aperture measuring device for measuring the size of an aperture of a through-hole in a conductive structure, comprising:
an aperture testing component capable of being inserted into the through-hole, wherein the aperture testing component comprises a plurality of resistor segments with different diameters, and wherein the individual resistor segments are successively connected in series in an order of sizes of the diameters of the individual resistor segments; and
a measuring module for measuring a resistance value of a resistor segment unable to be inserted into the through-hole, wherein the resistance value of the resistor segment is used to determine the size of the aperture of the through-hole.

2. The aperture measuring device according to claim 1, wherein the measuring module is connected with an outermost end of a resistor segment with the largest diameter in the aperture testing component via a first wire, and wherein the measuring module is connected with a circumference of an insertion inlet of the through-hole via a second wire.

3. The aperture measuring device according to claim 1, wherein the aperture testing component is arranged to be inserted into an insertion inlet of the through-hole from one end at which a resistor segment with the smallest diameter is located, until the aperture testing component cannot continue to be inserted.

4. The aperture measuring device according to claim 3, wherein the measuring module is configured to derive the diameters of both a last resistor segment insertable into the through-hole and a first resistor segment unable to be inserted into the through-hole according to the measured resistance value and a predetermined resistance value of each of the plurality of resistor segments and the diameter of each respective resistor segment, and wherein the measuring module is configured to determine the size of the aperture of the through-hole according to the derived diameters.

5. The aperture measuring device according to claim 4, wherein the measuring module is further configured to determine the size of the aperture of the through-hole as the diameter of the last resistor segment insertable into the through-hole in case of a distance between an outer surface of the last resistor segment insertable into the through-hole and an inner surface of the through-hole being less than a threshold distance; and wherein the measuring module is further configured to determine the size of aperture of the through-hole as the mean value of the diameter of the last resistor segment insertable into the through-hole and the diameter of the first resistor segment unable to be inserted into the through-hole in case of the distance being not less than the threshold distance.

6. The aperture measuring device according to claim 1, wherein the materials of the plurality of resistor segments are identical.

7. The aperture measuring device according to claim 6, wherein the plurality of resistor segments are integrally molded.

8. The aperture measuring device according to claim 1, further comprising a display module for displaying the determined size of the aperture of the through-hole.

9. The aperture measuring device according to claim 8, wherein the display module is a liquid crystal display or an organic electroluminescent display.

10. The aperture measuring device according to claim 1, wherein the lengths of the plurality of resistor segments are identical.

11. The aperture measuring device according to claim 10, wherein the length of each of the plurality of resistor segments is between 4 millimeters and 6 millimeters.

12. An aperture measuring method for measuring an aperture of a through-hole in a conductive structure, comprising:
   providing an aperture measuring device for measuring the aperture of a through-hole in a conductive structure, comprising:
      an aperture testing component capable of being inserted into the through-hole, wherein the aperture testing component comprises a plurality of resistor segments with different diameters, and wherein the individual resistor segments are successively connected in series in an order of sizes of the diameters of the individual resistor segments, and
      a measuring module for measuring a resistance value of a resistor segment unable to be inserted into the through-hole, wherein the resistance value of the resistor segment is used to determine the size of the aperture of the through-hole;
   inserting the aperture testing component into an insertion inlet of the through-hole from one end at which the resistor segment with a smallest diameter is located, until the aperture testing component cannot continue to be inserted
   measuring a resistance value of a resistor segment unable to be inserted into the through-hole;
   deriving the diameters of both a last resistor segment insertable into the through-hole and a first resistor segment unable to be inserted into the through-hole according to the measured resistance value and predetermined resistance values of the plurality of resistor segments in the aperture testing component and their diameters; and
   determining the size of the aperture of the through-hole according to the derived diameters.

13. The aperture measuring method according to claim 12, wherein the step of measuring the resistance value comprises:
   applying a voltage to the resistor segment unable to be inserted into the through-hole in the aperture testing component,
   measuring a current value flowing through the resistor segment, and
   deriving the resistance value of the resistor segment unable to be inserted into the through-hole in the aperture testing component according to the Ohm' law.

14. The aperture measuring method according to claim 12, wherein the step of determining the size of the aperture of the through-hole according to the derived diameters comprises:
   determining the size of the aperture of the through-hole as the derived diameter of the last resistor segment insertable into the through-hole in case of a distance between an outer surface of the last resistor segment insertable into the through-hole and an inner surface of the through-hole being less than a threshold distance; and
   determining the size of the aperture of the through-hole as a mean value of the derived diameter of the last resistor segment insertable into the through-hole and the derived diameter of the first resistor segment unable to be inserted into the through-hole in case of the distance being not less than the threshold distance.

15. The aperture measuring method according to claim 12, further comprising displaying the determined size of the aperture of the through-hole.

* * * * *